United States Patent Office 3,057,773
Patented Oct. 9, 1962

3,057,773
O,O-DIETHYL S-(1-HYDROXYETHYL)PHOSPHORO-THIOLOTHIONATE AS AN INSECTICIDE
Richard L. McConnell and Harry W. Coover, Jr., Kingsport, Tenn., assignors to Eastman Kodak Company, Rochester, N.Y., a corporation of New Jersey
No Drawing. Filed Nov. 13, 1957, Ser. No. 696,056
4 Claims. (Cl. 167—22)

This invention relates to a new organophosphorous compound. In a specific aspect this invention relates to a new phosphorothiolothionate useful as an insecticide, for example, against mites and aphids.

Many organophosphorous compounds are disclosed in the art, and some of these compounds have been found to be useful as insecticides. Certain phosphorothiolothionates have shown insecticidal properties, but the effectiveness of these compounds is quite variable. In fact, some phosphorothiolothionates are effective insecticidally while others possess little and sometimes no insecticidal properties. Thus, it is difficult to predict the properties of such compounds even though the properties of closely related compounds are known.

In accordance with this invention we have found that a certain phosphorothiolothionate has remarkable and outstanding insecticidal properties, particularly against mites and aphids. The insecticide within the scope of this invention is O,O-diethyl S-(1-hydroxyethyl)phosphorothiolothionate. The superior insecticidal properties were found quite unexpectedly since closely related compounds and actual homologs possess greatly inferior insecticidal properties.

The compound of this invention is prepared by reacting acetaldehyde and diethyl phosphorothiolothionate. In general, the reaction is carried out by slowly adding one reactant to the other, and any mode of addition of the reactants can be used. The reaction can be carried out using a wide variety of molar ratios of the reactants, but preferably an equimolar ratio is used. The reaction temperature is ordinarily within the range of −25 to 150° C. and preferably within the range of 25 to 100° C. If desired, inert solvents can be used as a reaction medium, but the reaction can be conducted in the absence of a solvent. Among the solvents that can be used are the normally liquid hydrocarbons, for example, pentane, hexane, heptane, octane, benzene, toluene, xylene, and the like as well as the halogenated derivatives of these hydrocarbons. The reaction can be conducted in the absence of a catalyst, but, if desired, basic catalysts, such as the tertiary amines, for example triethyl amine, can be used. Suitable reaction periods are within the range of ½ to 8 hours.

The preparation of the compound within the scope of this invention is illustrated by the following example.

Example 1

O,O-diethyl S-(1-hydroxyethyl)phosphorothiolothionate was prepared by the dropwise addition of acetaldehyde (0.1 mole) to stirred diethyl phosphorothiolothionate (0.1 mole). After the exothermic nature of the reaction had subsided, the reaction mixture was heated on a steam bath for 15 minutes with stirring. The crude product was an oil which was pure enough for use as an insecticide without further purification, $n_D^{20}$ 1.5148. The utility of this compound as an insecticide is demonstrated by the following example.

Example 2

Tests against mites and aphids were carried out in the following manner. Acetone solutions containing 1% by weight of the compound prepared in Example 1 were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on a damp paper toweling and observed after 24 hours for mortality among the adult mites. Similar tests were conducted on cowpea aphids (*Aphis medicaginis* Koch). It should be noted that acetone-water solutions containing no toxicant kill neither mites nor aphids. The results of these tests are shown below.

| Concentration of toxicant in p.p.m. | Percent kill, mites | Percent kill, aphids |
|---|---|---|
| 100 | 100 | 94 |
| 30 | 100 | 92 |
| 10 | 100 | 62 |

The remarkable effectiveness of the compound of this invention against mites and aphids is quite unexpected when it is realized that very closely related compounds and even homologs of this compound are considerably less effective as insecticides. This fact is demonstrated by the following example.

Example 3

A series of phosphorothiolothionates were tested against mites and aphids, and the LD 85 value, which is the concentration in parts per million required for an 85% kill of a given insect, is recorded below.

| Compound | LD85 (mites) | LD85 (aphids) |
|---|---|---|
| 1. CH$_3$CHOHSP(S)(OC$_2$H$_5$)$_2$ | 8 | 20 |
| 2. CH$_3$CH$_2$CH$_2$CHOHSP(S)(OC$_2$H$_5$)$_2$ | 30 | 675 |
| 3. (CH$_3$)$_2$CHCHOHSP(S)(OC$_2$H$_5$)$_2$ | [1] 100 | [2] 100 |
| 4. CCl$_3$CHOHSP(S)(OC$_2$H$_5$)$_2$ | 100 | 400 |
| 5. CH$_3$CH=CHCHOHSP(S)(OC$_2$H$_5$)$_2$ | [3] 100 | [3] 100 |
| 6. (C$_2$H$_5$)$_2$NCH$_2$C(CH$_3$)$_2$CHOHSP(S)(OC$_2$H$_5$)$_2$ | [4] 100 | [5] 100 |
| 7. CH$_2$=CHCH$_2$C(CH$_3$)$_2$CHOHSP(S)(OC$_2$H$_5$)$_2$ | 65 | -------- |
| 8. ClCH$_2$CCl$_2$CHOHSP(S)(OC$_2$H$_5$)$_2$ | 90 | 100 |
| 9. (CH$_3$)$_2$CHCH(OC$_2$H$_5$)CHOHSP(S)(OC$_2$H$_5$)$_2$ | 100 | -------- |

[1] 62% kill at 100 p.p.m.
[2] 31% kill at 100 p.p.m.
[3] 81% kill at 100 p.p.m.
[4] 21% kill at 100 p.p.m.
[5] 3% kill at 100 p.p.m.

It should be noted that compound 1, which is the compound of this invention, is much more effective against mites and aphids than any of the related compounds, including its homologs. It is also noteworthy that compounds 4 and 8 possess a much lower effectiveness than the compounds of this invention, although it is generally believed that chlorinated compounds excel as insecticides.

For insecticidal purposes the substantially pure compound of this invention can be used. However, it is also possible to use as the insecticide the reaction mixture resulting from the reaction of acetaldehyde and diethyl phosphorothiolothionate. This is particularly true when the reactants are employed in an equimolar ratio, and the need for extensive purification procedures is thus avoided.

The insecticide of this invention can be applied to infested areas or plants in the form of a solution, for example in the solvents named above, an aqueous emulsion or in the form of a dust with the insecticide dispersed on a dry inert solid material.

We claim:

1. As a composition of matter, an insecticidal composition containing O,O-diethyl S-(1-hydroxyethyl)phosphorothiolothionate in an insecticidally effective quantity.

2. The method for killing mites which comprises contacting the mites with O,O-diethyl S-(1-hydroxyethyl) phosphorothiolothionate.

3. The method for killing aphids which comprises contacting the aphids with O,O-diethyl S-(1-hydroxyethyl) phosphorothiolothionate.

4. As a composition of matter, an insecticidal composition containing the reaction product of substantially equimolar quantities of acetaldehyde and diethyl phosphorothiolothionate.

References Cited in the file of this patent

UNITED STATES PATENTS

| | | |
|---|---|---|
| Re. 20,411 | Romieux et al. | June 15, 1937 |
| 1,949,629 | Romieux et al. | Mar. 6, 1934 |
| 2,266,514 | Romieux et al. | Dec. 16, 1941 |
| 2,565,920 | Hook et al. | Aug. 28, 1951 |
| 2,577,966 | Hook et al. | Dec. 11, 1951 |
| 2,783,203 | McDermott | Feb. 26, 1957 |
| 2,783,204 | McDermott | Feb. 26, 1957 |
| 2,844,616 | McDermott | July 22, 1958 |

FOREIGN PATENTS

| | | |
|---|---|---|
| 1,137,311 | France | May 27, 1957 |

OTHER REFERENCES

Kabachnik et al.: "Chem. Abst., vol. 50, col. 9281 (July 10, 1956).

Mastryukova et al.: "Proc. Acad. Sci. U.S.S.R., Sect. Chem." 109, pp. 467–470 (1956).